US012159287B2

(12) United States Patent
Lee et al.

(10) Patent No.: US 12,159,287 B2
(45) Date of Patent: Dec. 3, 2024

(54) SYSTEM FOR DETECTING ASSOCIATED RECORDS IN A RECORD LOG

(71) Applicant: Capital One Services, LLC, McLean, VA (US)

(72) Inventors: Jonathan Lee, Kitchener (CA); Elijah Moreau-Arnott, Guelph (CA); Steve Frensch, Kitchener (CA); Garrett Randall, Corunna (CA)

(73) Assignee: Capital One Services, LLC, McLean, VA (US)

( * ) Notice: Subject to any disclaimer, the term of this patent is extended or adjusted under 35 U.S.C. 154(b) by 706 days.

(21) Appl. No.: 17/248,460

(22) Filed: Jan. 26, 2021

(65) Prior Publication Data

US 2022/0237618 A1 Jul. 28, 2022

(51) Int. Cl.
| | |
|---|---|
| *G06Q 20/40* | (2012.01) |
| *G06F 16/906* | (2019.01) |
| *G06N 3/04* | (2023.01) |
| *G06N 20/00* | (2019.01) |
| *G06Q 20/10* | (2012.01) |
| *G06Q 40/12* | (2023.01) |

(52) U.S. Cl.
CPC ......... *G06Q 20/407* (2013.01); *G06F 16/906* (2019.01); *G06N 3/04* (2013.01); *G06N 20/00* (2019.01); *G06Q 20/10* (2013.01); *G06Q 40/12* (2013.12)

(58) Field of Classification Search
CPC .................................................. G06Q 40/12
See application file for complete search history.

(56) References Cited

U.S. PATENT DOCUMENTS 7,941,370 B2   5/2011  Paulsen et al.
8,892,468 B1   11/2014 Litle
(Continued)

FOREIGN PATENT DOCUMENTS

JP          6434188 B2 *  12/2018  ............. G06Q 20/08

OTHER PUBLICATIONS

U. Kiruthika, S. K. S. Raja, C. J. Raman and V. Balaji, "A Novel Fraud Detection Scheme for Credit Card Usage Employing Random Forest Algorithm Combined with Feedback Mechanism," 2020 (ICPECTS), Chennai, India, 2020, pp. 1-6. URL: https://ieeexplore.ieee.org/document/9337045?source=IQplus (Year: 2020).*
(Continued)

*Primary Examiner* — Ilana L Spar
*Assistant Examiner* — Melinda Gieringer
(74) *Attorney, Agent, or Firm* — Harrity & Harrity, LLP

(57) ABSTRACT

In some implementations, a system may identify a mitigation record in a record log associated with an account of an application. The system may append a message prompt to the mitigation record that causes the application to request, during a user session associated with the account, an indication of whether there is an association between the mitigation record and an event record. The system may receive, from a user device associated with the user session, feedback associated with the message prompt that indicates whether the mitigation record is associated with the event record. The system may perform, based on the feedback, an action associated with indicating whether the mitigation record and the event record are associated.

20 Claims, 9 Drawing Sheets

(56) References Cited

U.S. PATENT DOCUMENTS

| | | | |
|---|---|---|---|
| 9,785,945 B2 | 10/2017 | Groarke et al. | |
| 10,460,391 B2* | 10/2019 | Caldwell | G06T 11/206 |
| 11,151,468 B1* | 10/2021 | Chen | G06N 7/01 |
| 11,416,867 B2* | 8/2022 | Lopes | G06Q 20/14 |
| 2009/0222364 A1* | 9/2009 | McGlynn | G06Q 40/12 |
| | | | 705/30 |
| 2010/0312629 A1* | 12/2010 | Wolf | G06Q 30/0226 |
| | | | 705/14.27 |
| 2015/0242835 A1 | 8/2015 | Vaughan et al. | |
| 2016/0117689 A1* | 4/2016 | Oshry | G06F 16/24556 |
| | | | 705/7.29 |
| 2019/0108582 A1 | 4/2019 | Sebastian et al. | |
| 2019/0138384 A1* | 5/2019 | Nair | G06N 7/02 |
| 2019/0259293 A1* | 8/2019 | Hellman | G06F 16/40 |
| 2020/0285644 A1* | 9/2020 | Tseretopoulos | G06Q 40/02 |
| 2020/0320292 A1* | 10/2020 | Chawda | G06Q 20/389 |
| 2020/0334705 A1* | 10/2020 | Benkreira | H04L 63/1433 |
| 2021/0024094 A1* | 1/2021 | Maat | B60W 60/00276 |
| 2021/0044659 A1* | 2/2021 | Kursun | H04L 67/146 |

OTHER PUBLICATIONS

N. Kalaiselvi, S. Rajalakshmi, J. Padmavathi and J. B. Karthiga, "Credit Card Fraud Detection Using Learning to Rank Approach," 2018 (ICCPEIC), Chennai, India, 2018, pp. 191-196, URL: https:/ieeexplore.ieee.org/stamp/stamp.jsp?tp=&arnumber=8525171&isnumber=8525138 (Year: 2018).*

* cited by examiner

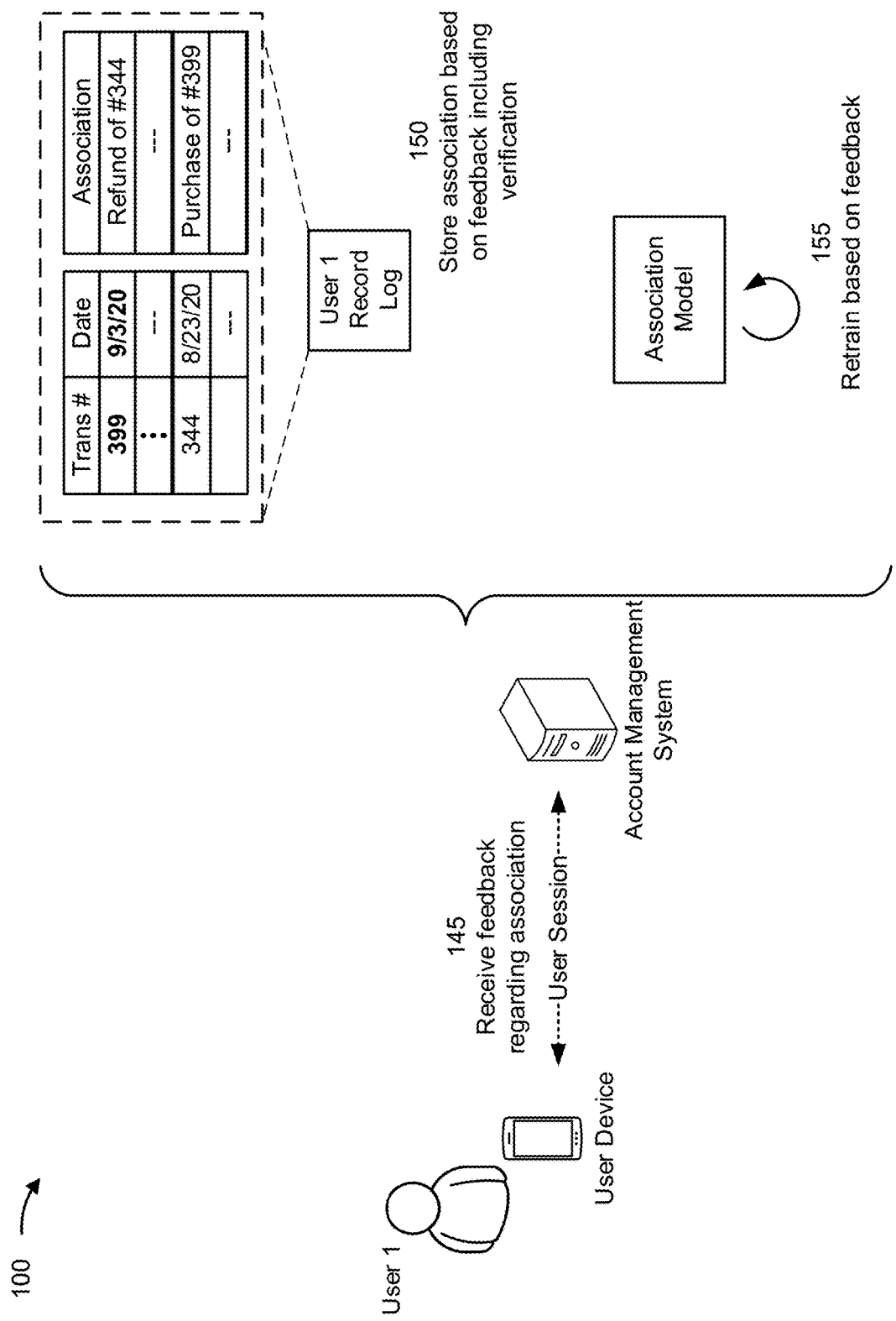

```
500
```

- 510 — Monitor the record log of an account associated with an application
- 520 — Identify a mitigation record in the record log
- 530 — Analyze, based on identifying the mitigation record, the record log to identify a subset of event records in the record log that are associated with one or more return attributes of the mitigation record
- 540 — Determine, using an association model, an association score associated with the mitigation record and an event record of the subset of event records
- 550 — Determine that the association score indicates that the probability satisfies a probability threshold
- 560 — Append, to the mitigation record, a message prompt that causes the application to indicate an association between the mitigation record and the event record when the event record is presented via a display of a user device that is executing the application
- 570 — Receive, from the user device, feedback associated with the message prompt that verifies whether the mitigation record is associated with the event record
- 580 — Perform an action associated with the feedback, the mitigation record, and the event record

FIG. 5

SYSTEM FOR DETECTING ASSOCIATED RECORDS IN A RECORD LOG

BACKGROUND

Activity associated with a user account may be tracked using records in a record log. For example, the activity may involve events involving a user of the user account and/or actions performed by the user in association with the user account. Certain types of events and/or actions may define attributes included in the records.

SUMMARY

In some implementations, a system for detecting associated records in a record log includes one or more memories and one or more processors, communicatively coupled to the one or more memories, configured to: monitor the record log of an account associated with an application; identify a mitigation record in the record log; analyze, based on identifying the mitigation record, the record log to identify a subset of event records in the record log that are associated with one or more return attributes of the mitigation record; determine, using an association model, an association score associated with the mitigation record and an event record of the subset of event records, wherein the association score is indicative of a probability that the mitigation record and the event record are associated with a same event; determine that the association score indicates that the probability satisfies a probability threshold; append, to the mitigation record, a message prompt that causes the application to indicate an association between the mitigation record and the event record when the event record is presented via a display of a user device that is executing the application; receive, from the user device, feedback associated with the message prompt that verifies whether the mitigation record is associated with the event record; and perform an action associated with the feedback, the mitigation record, and the event record.

In some implementations, a method for detecting associated records in a record log includes identifying a mitigation record in the record log associated with an account of an application; determining, using an association model, an association score associated with the mitigation record and an event record of the record log, wherein the association score is indicative of a probability that the mitigation record and the event record are associated with a same event, and wherein the association score is determined based on a comparison of return attributes of the mitigation record and charge attributes of the event record; determining that the association score indicates that the probability satisfies a probability threshold; appending a message prompt to the mitigation record that causes the application to request, during a user session associated with the account, an indication of whether there is an association between the mitigation record and the event record; receiving, from a user device associated with the user session, feedback associated with the message prompt that indicates whether the mitigation record is associated with the event record; and performing, based on the feedback, an action associated with indicating whether the mitigation record and the event record are associated.

In some implementations, a non-transitory computer-readable medium storing a set of instructions includes one or more instructions that, when executed by one or more processors of a system, cause the system to: detect that a mitigation record has been added to a record log associated with an account of an application; determine, based on detecting the mitigation record and using an association model, a probability that the mitigation record is associated with a particular event record of the record log based on a return attribute of the mitigation record, wherein the association model comprises a machine learning model that is trained to identify associations between newly identified mitigation records and previously stored event records of a plurality of accounts of the application; append, to the mitigation record and based on determining the probability satisfying a probability threshold, an association tag that indicates an association between the mitigation record and the particular event record; and cause, based on the association tag, the application to indicate the association between the mitigation record and the particular event record on a display of a user device associated with the account.

BRIEF DESCRIPTION OF THE DRAWINGS

FIGS. 1A-1E are diagrams of an example implementation relating to a system for detecting associated records in a record log.

FIG. 5 is a flowchart of an example process relating to a system for detecting associated records in a record log.

DETAILED DESCRIPTION

Figure 1A:
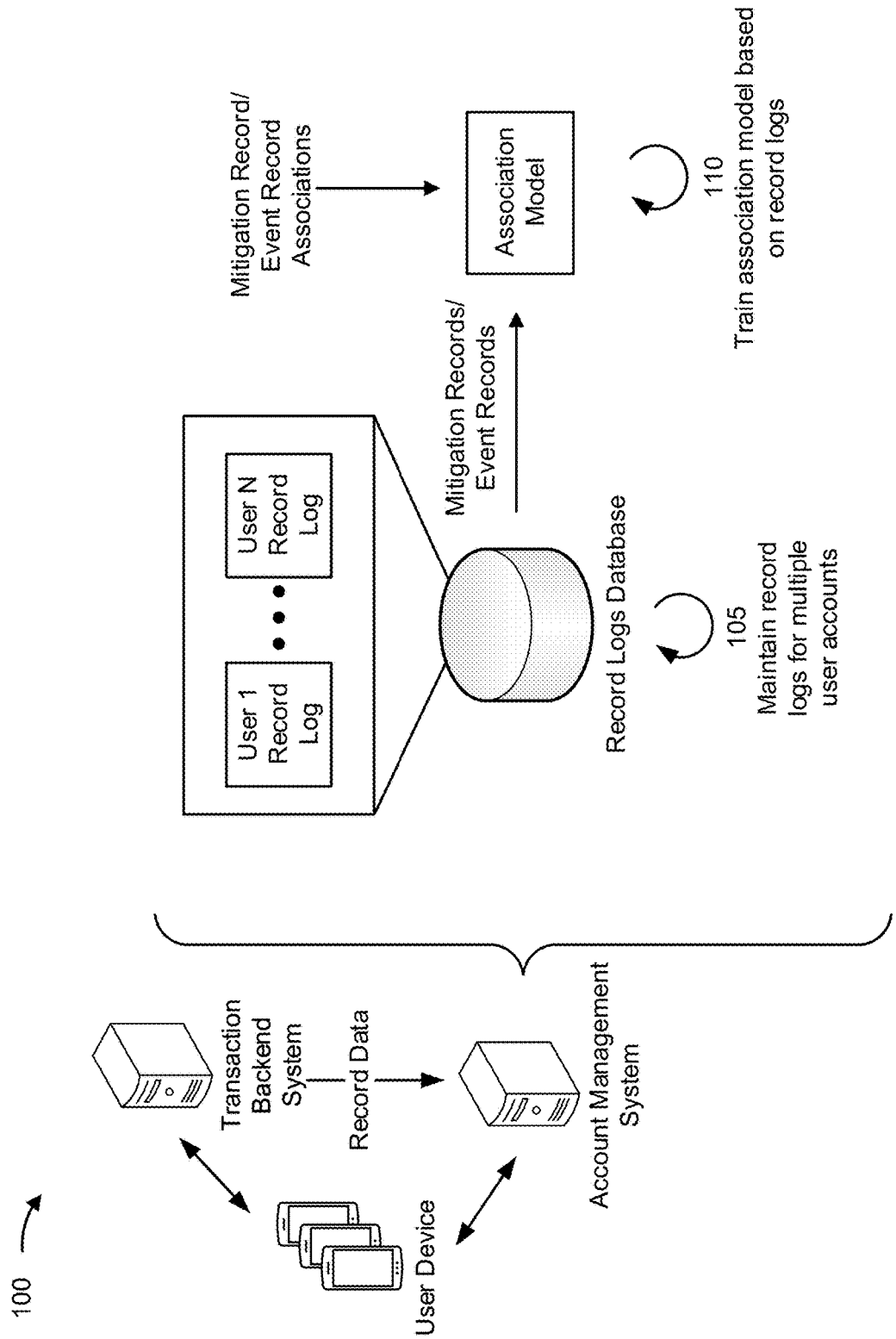

The following detailed description of example implementations refers to the accompanying drawings. The same reference numbers in different drawings may identify the same or similar elements.

Various applications may utilize records and/or a record log (e.g., a collection of records) to manage and/or provide information associated with sources of the records. For example, a record log may maintain records associated with events and/or actions involving an account associated with the record log. Further, a user may register an account with an application that is configured to maintain a record log for the user. An account management system of the application may manage the account via a record log of records associated with events or actions involving the user. For example, the user may access the record log to review information associated with the events and/or actions associated with the records. As a more specific example, a banking application may utilize a record log to maintain records of transactions (e.g., credits and/or debits of the account) involving an account registered to a user (e.g., a transaction account holder, such as a consumer) of a banking institution or other type of financial institution. In such an example, the user, via the banking application, may review record logs corresponding to financial statements and/or transaction activity. For example, the user may monitor balances and/or cash flow based on transactions performed using the account and/or may review the account for fraudulent activity, such as unauthorized use of the transaction account for a transaction.

Records in a record log may inherently be associated with one another. For example, as used herein, a mitigation record may be associated with an event record. More specifically, the mitigation record may correspond to an adjustment (e.g., associated with an account) and/or an offset of a related event record. Additionally, or alternatively, a mitigation record may be generated and/or stored based on an event or action associated with another event or other action associated with a related event record. Certain account management systems may not determine or indicate, within the records or the record log, an association between a mitigation record and a particular event record. However, a determination of an association between a mitigation record and an event record may permit an account management system to recognize and/or determine information associated with attributes of the mitigation record and the event record. Furthermore, an indication of an association between a mitigation record and an event record, which may be referred to collectively as "the records," (e.g., within the records, within the record log, via a user interface of an application, and/or within a message from the account management system) may enhance a user experience associated with accessing a record log. For example, providing an indication of an association between records may permit the user to more quickly and easily reconcile information associated with the records because the user would not have to manually review the record log to identify an event record that is associated with a mitigation record.

Some implementations described herein provide an account management system that determines and/or indicates an association between a mitigation record and an event record. For example, based on detecting that a mitigation record has been added to a record log, the account management system may analyze event records of the record log to identify which of the event records is associated with the mitigation record. In some implementations, the account management system may utilize a machine learning model to learn and/or identify information associated with historical event records and/or historical mitigation records to determine that a mitigation record corresponds to an adjustment and/or offset of an event record. The historical event records and/or historical mitigation records may be associated with multiple user accounts that are managed by the account management system. Accordingly, the machine learning model may be trained based on multiple record logs (each of which may include hundreds, thousands, or more records), thereby permitting the machine learning model to more accurately determine that a mitigation record is associated with an event record, relative to making a determination using information that is only available from records in the particular record log of the mitigation record and event record.

As mentioned above, a record log may include hundreds, thousands, or more event records. Accordingly, when a mitigation record is detected, an account management system may consume a relatively large amount of resources to obtain, process, and/or analyze the record log and identify a particular event record that is associated with a mitigation record. For example, the account management system may consume communication resources and/or network resources to obtain the event records (e.g., from a data structure storing the record log) and/or computing resources (e.g., processor resources, memory resources, and/or power resources) to process and/or analyze the event records. In some implementations, based on information that is learned using the machine learning model, the account management system may efficiently select, process, and/or analyze the event records in the record log to identify a particular event record that is associated with the mitigation record. For example, the account management system may filter out event records from the record log that are not associated with the mitigation records based on the learned and/or identified information. In this way, the account management system may reduce and/or conserve computing resources and/or network resources associated with obtaining, processing, and/or analyzing the record log relative to other systems.

FIGS. 1A-1E are diagrams of an example implementation 100 associated with a system for detecting associated records in a record log. As shown in FIGS. 1A-1E, example implementation 100 includes an account management system, a transaction backend system, and one or more user devices. These devices are described in more detail below in connection with FIG. 3 and FIG. 4. In example implementation 100, a user (shown as User 1) is associated with one of the user devices and may have a user account that is registered to an application that is executing on the user device and/or that is managed by the account management system (e.g., via an application server associated with the application).

As described herein, records of a record log may be associated with various transactions. While certain examples are described herein with reference to one or more financial transactions (e.g., involving a purchase and/or a refund), the examples may similarly apply to other types of transactions, such as a security-related transaction (e.g., associated with individuals gaining access to secure areas and/or devices gaining access to secure computing systems), a data-related transaction (e.g., associated with providing or receiving data), and/or a resource-related transaction (e.g., associated with allocating or distributing computing resources, such as processing resources and/or memory resources).

As shown in FIG. 1A, and by reference number 105, the account management system maintains record logs for multiple user accounts. For example, the account management system may include and/or be associated with a data structure (shown as a Record Logs Database) that is configured to store record logs associated with multiple users, shown as and referred to herein as User 1 to User N (N≥1). Corresponding records logs of User 1 to User N are maintained in the record logs database as User 1 Record Log to User N Record Log.

Referring to the banking application above, when a user engages in a purchase, such as a transaction for goods and/or services, the account management system may generate and store an event record associated with the purchase. The account management system may maintain the event record in the User 1 Record Log. The User 1 record log includes records associated with the user account of User 1. In example implementation 100, the user account of User 1 may correspond to a transaction account, such as a checking account, a savings account, a credit account, or other type of financial account. Further, as described elsewhere herein, User 1 may have an opportunity to obtain a whole or partial refund of an amount paid for the purchase, via the transaction account, based on various circumstances (e.g., circumstances where products and/or services are non-compliant, defective, undesired, returned, and/or the like). Correspondingly, if the merchant issues a refund (e.g., a transaction involving a reimbursement of funds, a discount, and/or a rebate) to the user via the transaction account, the account management system may generate a mitigation record associated with the refund. Accordingly, the mitigation record associated with the refund may reflect an adjustment and/or an offset of the value of the purchase associated with the event record.

The account management system may similarly maintain the record logs of User 2 to User N in User 2 Record Log to User N Record Log, respectively. Accordingly, the account management system, as configured, may operate to collect, generate, and/or manage records in record logs associated with multiple users.

As further shown in FIG. 1A, and by reference number 110, the account management system may train an association model based on record logs. For example, the account management system may train the association model based on records (e.g., event records and/or mitigation records) from the multiple record logs that are associated with the multiple user accounts that are managed by the account management system. Additionally, or alternatively, the account management system may train the association model based on indicated mitigation record/event record associations (e.g., indications that identify relationships between mitigation records and related event records). The indicated mitigation record/event record associations may be provided via a user input (e.g., using a supervised learning technique) and/or another system (e.g., using an unsupervised learning technique).

The association model may be associated with a machine learning model (e.g., a neural network, a clustering model, and/or a prediction model). The machine learning model may be trained to identify associations between mitigation records (e.g., newly identified mitigation records that are added to the record logs) and previously stored event records (e.g., historical event records associated with previous transactions or other types of events or actions). For example, the account management system may train the machine learning model based on historical records (e.g., records that are stored in the Record Log Database) associated with the multiple user accounts and previously determined associations between historical mitigation records and historical event records of the historical records. In this way, the account management system may utilize multiple user accounts associated with an application of the account management system (e.g., a banking application used by the account management system to manage transactions involving the user accounts).

The account management system may train the association model based on the multiple record logs to improve an accuracy with respect to identifying which event record(s) of a plurality of similar event records are associated with a mitigation record. For example, multiple factors may be used by the account management systems (and/or a user reviewing the record log) to determine that a particular mitigation record is associated with a particular event record (e.g., that a particular refund is for a particular transaction). In many cases, a set of event records may similarly indicate an association to a mitigation record based on the set of event records identifying a same merchant, the set of event records being associated with a same or similar value, and/or the set of event records being associated with a same or similar time period. For example, a user may make multiple purchases from a same merchant, which causes an account management system to maintain, in the record log, multiple corresponding event records that identify the merchant and indicate respective values of the purchases. If the merchant issues a refund for one or more of the purchases, the account management system may be trained to accurately identify which of the event records is associated with a mitigation record for the refund based on the value of the refund and/or based on timing associated with the event records. However, a value for a partial refund (e.g., issued based on a user returning a subset of products that were originally purchased in a same purchase transaction) likely is not an additive inverse of a value of a purchase. Therefore, multiple event records that identify the merchant and indicate a value that is greater than the additive inverse of the mitigation record may appear to be associated with the mitigation record. More specifically, a refund of $10 from a merchant may appear to be associated with any event record in the record log with a value of $10 or more that also identifies the merchant. Accordingly, the association model, using the historical records of the multiple user accounts, may more accurately determine which of the event records that appear to be similar are likely associated with the mitigation record.

In some implementations, the association model may be trained to identify patterns and/or trends associated with the historical records that are based on timing and/or values associated with a particular merchant. For example, the association model may be trained to identify a likely time period that corresponds to a window of time that the merchant allows for refunds or returns to a user for a purchase (e.g., based on learned or identified patterns or trends in the event record/mitigation record associations). Additionally, or alternatively, based on the historical records and/or indicated associations, the association model may be trained to identify whether partial refunds are commonly issued for a merchant and/or whether third party refunds (e.g., associated with a governmental agency, such as for a value added tax refund) are possible or likely for a particular merchant. In this way, the association model, with improved accuracy, may determine which event records of a record log are associated with a particular mitigation record (e.g., most likely associated according to the trained association model).

In some implementations, the account management system may train the association model to identify one or more attributes associated with the event records and/or the mitigation records that can be used to filter and/or preprocess records in a record log to more efficiently determine an association between a mitigation record and a particular event record. For example, based on one or more attributes of the mitigation record, the account management system may filter (e.g., using a decision tree) event records from the record log to prevent the account management system from having to analyze all records in the record log and/or to prevent the account management system from analyzing event records in the record log that are likely not associated with the mitigation record. More specifically, the account management system may more efficiently process the record log by not analyzing or processing event records that likely do not involve a same merchant as the mitigation record, event records that are likely not associated with a value of the mitigation record, and/or event records that are associated with a time period that is likely outside of a threshold time period associated with a time of the mitigation record (e.g., outside of a learned return window of refund policy associated with a merchant).

In some implementations, the account management system may cause the association model to be trained, as described herein, based on the record logs. For example, the account management system may provide records (e.g., record data associated with the records) from the record logs to the association model. In such a case, a controller of the association model and/or another system may be configured to train the association model based on the record logs, as described herein.

In some implementations, the account management system may receive the association model from the controller and/or the other system after the association model is trained by the controller and/or the other system according to the historical records and/or associations between mitigation records and event records of the historical records. The association model may be trained, retrained, and/or utilized by the account management system using one or more encryption techniques to maintain privacy and/or security of personal information and/or confidential information of individuals associated with the multiple user accounts. The association model may be trained and/or utilized as further described in connection with FIG. 2.

Figure 1B:
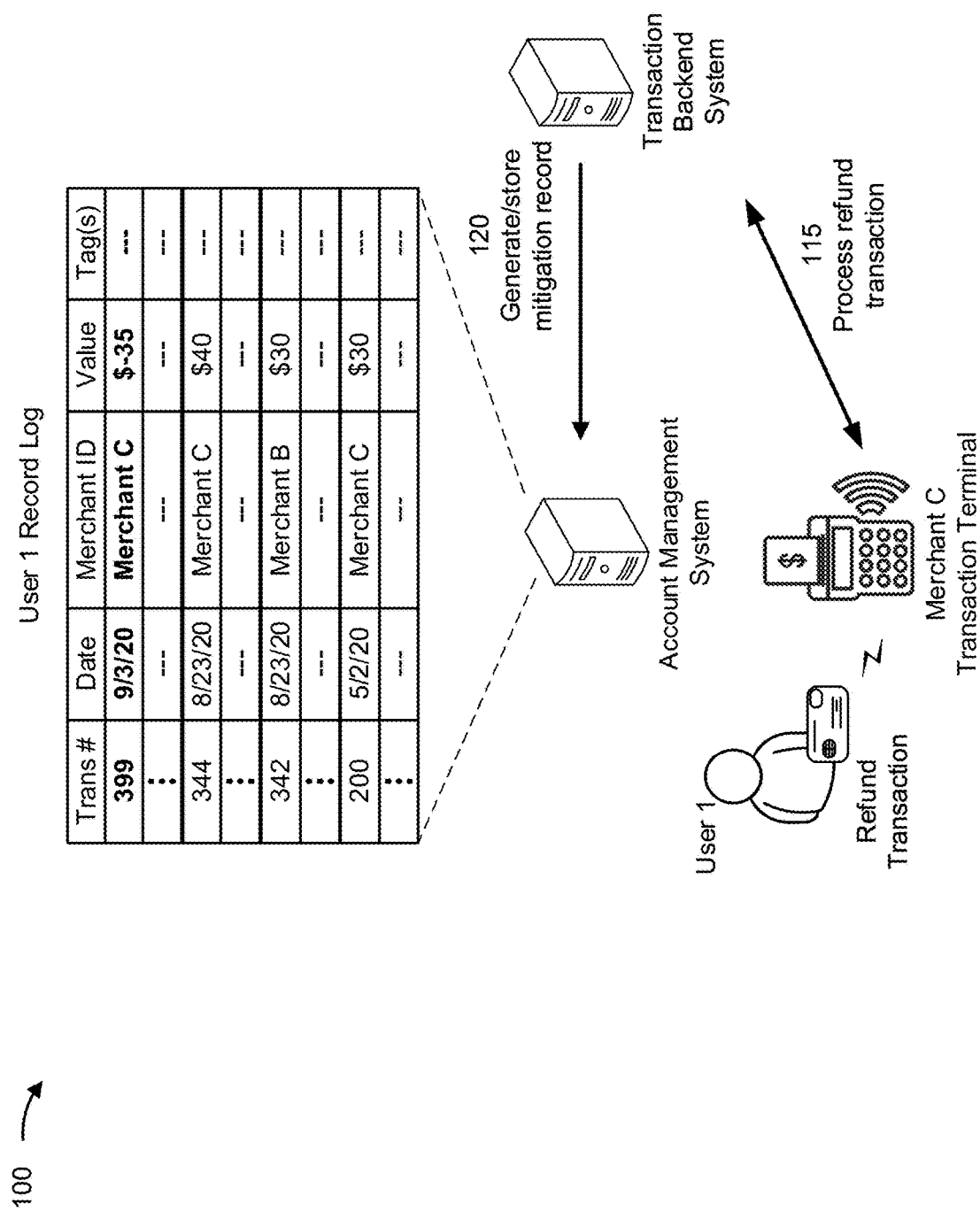

As shown in FIG. 1B, and by reference number 115, the transaction terminal and the transaction backend system process a refund transaction. For example, User 1 may engage in a transaction with a merchant (Merchant C) using the transaction terminal and a transaction device, such as a transaction card (e.g., a credit card, a debit card, and/or a loyalty card). In some implementations, User 1 may engage in the refund transaction using a user device (e.g., a user device that is executing the application associated with the account management system). Accordingly, the transaction terminal and/or the transaction backend system may process the refund transaction based on the User 1 engaging in the refund transaction and/or Merchant C issuing a refund to User 1.

The refund transaction may involve a refund associated with a service that was previously provided by Merchant C and/or a refund for returning a product that was previously purchased from Merchant C. Correspondingly, the refund transaction may be related to a purchase transaction (e.g., a purchase transaction associated with the previously provided service or the previously purchased product) that was previously performed using the user account. Accordingly, the User 1 Record Log may include an event record associated with the purchase transaction.

Although example implementation 100 involves use of a transaction terminal and/or a transaction backend to process a refund transaction, refund transactions may be processed using one or more other devices or types of systems. For example, a third party entity may issue a refund to User 1 for a purchase according to various circumstances. As a specific example, a rebate organization may issue a refund to User 1 for a purchase transaction.

As further shown in FIG. 1B, and by reference number 120, the transaction backend system causes the account management system to generate and/or store a mitigation record associated with the refund transaction. For example, based on executing the refund transaction between User 1 and Merchant C, the transaction backend system causes the account management system to generate a mitigation record (identified by transaction number "399" in FIG. 1B) in the record log associated with User 1's user account. The mitigation record identifies a date of the transaction ("9/3/20"), a merchant ID of Merchant C ("Merchant C"), and a value of the transaction ("$−35"). Additionally, or alternatively, the record log may include timing and/or location information associated with the transaction, as determined or identified by the account management system, based on transaction information received from the transaction backend system.

Figure 1C:
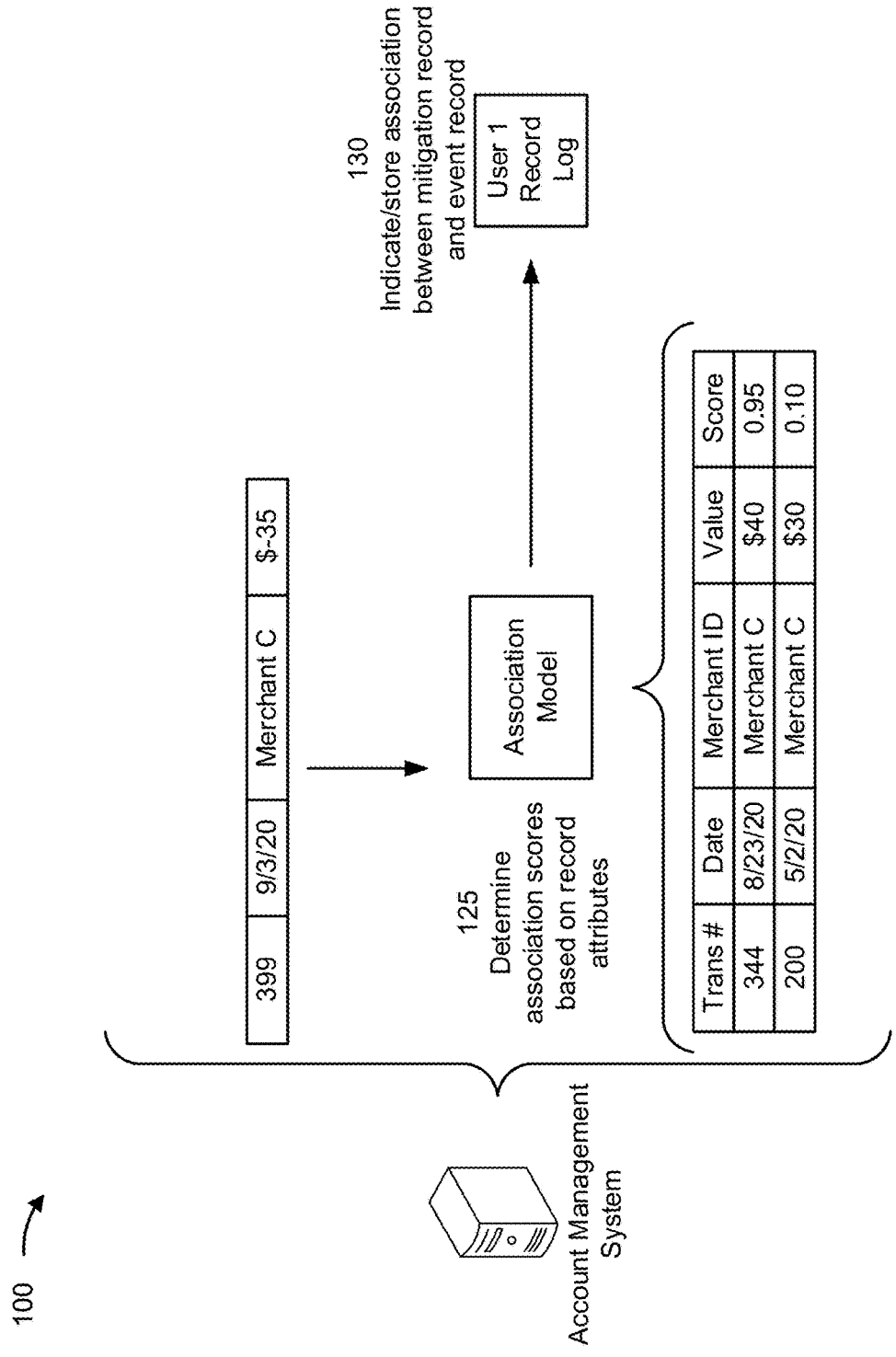

As shown in FIG. 1C, and by reference number 125, the account management system determines association scores based on record attributes. The account management system may monitor the record log for newly received mitigation records (e.g., by monitoring for transaction records associated with a refund or transaction records that have a negative value). Based on identifying or detecting a mitigation record, the account management system, using the association model, may compare one or more attributes (e.g., return attributes) associated with the mitigation record with one or more corresponding attributes (e.g., charge attributes) in the event records of the record log using a similarity analysis technique (e.g., a clustering technique and/or a cosine similarity technique). Using the similarity analysis technique, the account management system and/or the association model may determine an association score between a mitigation record and one or more of the event records in the record log.

In some implementations, the account management system may preprocess the record logs in the User 1 Record Log to filter event records that are likely not associated with a particular mitigation record. For example, using the association model, the account management system may filter event records based on a merchant identified in the event records, based on timing of the event records, and/or based on values of the event records. Accordingly, the account management system, in association with analyzing the record log, may filter other mitigation records from the record log, certain event records that are outside of a time period associated with a time of the mitigation record that is identified by a timestamp attribute, certain event records that are associated with a value that is outside of a range from zero to an additive inverse of a value attribute of the mitigation record, and/or certain event records that are not associated with an entity that is identified by an entity attribute (or merchant attribute) of the mitigation record.

Accordingly, as shown, the account management system may preprocess the User 1 Record Log to filter all records, other than event record 344 and event record 200, from being analyzed as described herein. For example, although other event records may have identified Merchant C, the other records may have been eliminated from being compared to the mitigation record, as elsewhere herein, based on the other event records not being associated with a particular time period of the mitigation record (e.g., a most recent time period that corresponds to a return window of Merchant C). Additionally, or alternatively, the account management system may not compare the event record 200 with mitigation record 399 using the similarity analysis based on the value ($35) of the mitigation record being outside of a particular range of the value of the event record 200. The range may correspond to zero and an additive inverse of the event record ($0 to $30). In some implementations, the additive inverse may be determined based on an exchange rate between a currency used by the account management system and a currency used by a merchant (e.g., if the merchant is a foreign merchant). For example, the account management system may convert a past value of an event record to a current value based on a change in the exchange rate over the course of a time period between a time of the event record and a time of the mitigation record. Accordingly, the account management system may identify that a mitigation record may be associated with an event record despite a value of the mitigation record being different from a value of the event record.

In this way, the account management system may prevent consumption of computing resources that would otherwise be consumed by analyzing and/or processing event records that are likely not associated with mitigation record 399.

As further shown in FIG. 1C, and by reference number 130, the account management system may indicate and/or store an association between the mitigation record and the event record. For example, the account management system may identify and/or select the event record that the association model indicates is likely associated with the mitigation record. The account management system may identify and/ or select the event record based on a probability that the event record is associated with the mitigation record satisfying a probability threshold. In some implementations, the probability threshold may be determined based on the association score and/or a confidence level associated with the association model determining the association score. For example, the confidence level may correspond to an error probability that is based on a quantity of related records and/or information that is available for a particular comparison of a mitigation record and a particular event record. More specifically, a lesser confidence level may be determined when the association model is trained based on relatively fewer records and/or fewer record logs (which typically corresponds to a lower level of accuracy) and a higher confidence level may be determined when the association model is trained based on relatively more records and/or more record logs (which typically corresponds to a higher level of accuracy).

As shown, the association model may determine that an association score between mitigation record 399 and event record 344 is 0.95 (which may indicate a relatively high probability of being associated) and the association score between mitigation record 399 and event record 200 is 0.10 (which may indicate a relatively low probability of being associated). Accordingly, the account management system may indicate and/or store an association between event record 344 (e.g., based on the association score indicating that the event record 344 is the event record in the record log that is most likely associated with the mitigation record).

In some implementations, the association may be appended to the record log in connection with a message prompt that is configured to be displayed during a user session, as described elsewhere herein. The account management system and/or the association model may determine that a message prompt is to be provided to the user based on the association score. More specifically, the association score may indicate that an event record is likely associated with a mitigation record with a particular level of accuracy (e.g., based on the value of the association score). For example, if the association score is within a particular range (e.g., between 0.50 and 0.95, corresponding to a 50%-95% likelihood of being associated), the account management system may store the message prompt to obtain feedback associated with whether the mitigation record is associated with the event record.

Figure 1D:
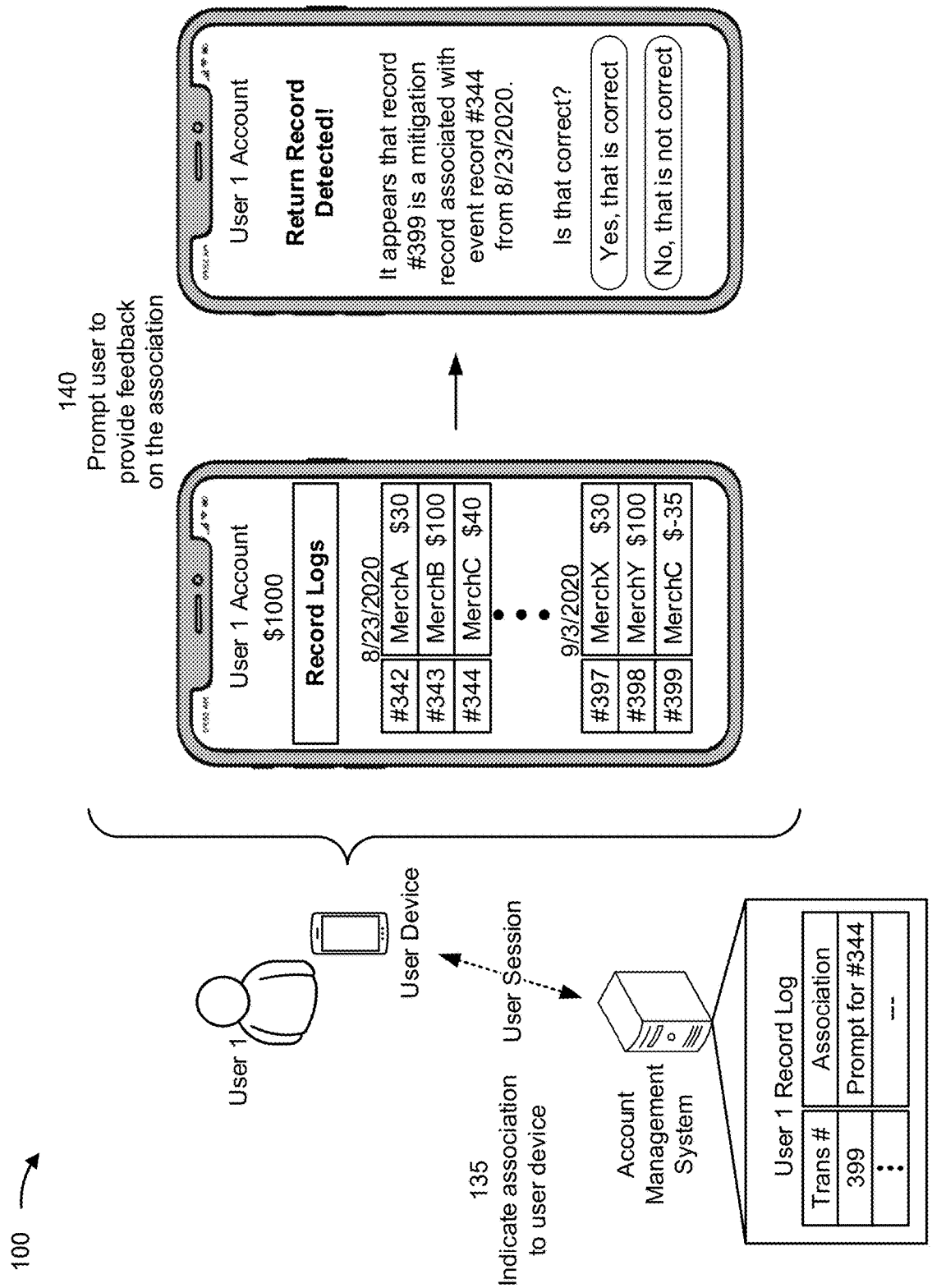

As shown in FIG. 1D, and by reference number 135, the account management system indicates the association to the user device. For example, User 1, via the user device, may access the record log via a user session. For example, the user session may involve the application being opened (e.g., by User 1) and/or executing on the user device. During the user session, the user device may receive, via the application, the record log (e.g., based on the record log being associated with User 1's user account, which is registered to the application). For example, based on a user input to open the record log, the user device may submit a request to the account management system to provide the record log and/or stream (e.g., as a backend system of the application) records of the record log to the user device.

In some implementations, during the user session, the account management system and/or the application may monitor which records of the record log are being displayed via the user device and/or which records in the record log are likely to be displayed (e.g., based on one or more other records being displayed that are within a threshold quantity of records from one or more record logs that are actively being presented on the display of the user device). As described elsewhere herein, based on the record log being displayed and/or the mitigation record 399 being displayed, the user device may determine whether the mitigation record is associated with one of the event records, as described elsewhere herein.

As further shown in FIG. 1D, and by reference number 140, the user device prompts the user to provide feedback on the association. In example implementation 100, the account management system maintains, within the User 1 Record Log, that a prompt is to be indicated during the user session. Accordingly, the user device, based on receiving the association between mitigation record 399 and event record 344 in connection with the prompt, when the record log and/or mitigation record 399 is displayed via the user device, the application and/or the user device may prompt User 1 for feedback to indicate whether or not mitigation record 399 is associated with event record 344. In this way, the user device may receive a verification of whether mitigation record 399 is associated with event record 344.

As shown in FIG. 1E, and by reference number 145, the account management system receives feedback regarding the association. For example, the feedback may correspond to a user input that is received from the application during the user session. More specifically, the feedback may be associated with the message prompt (e.g., based on the user interacting with a clickable interface or button of the message prompt). The feedback may verify whether or not the mitigation record is associated with the event record. For example, the feedback may include a verification that the mitigation record is associated with the event record. On the other hand, the feedback may include an indication that the mitigation record is not associated with the event record. In some implementations, the feedback may include an indication and/or a specification of a particular event record that is associated with the mitigation record. For example, if the indicated event record in the prompt is not associated with the mitigation record, User 1 may specify which event record from the User 1 Record Log is associated with the mitigation record (e.g., to permit the association model to learn from the association and/or be retrained based on the indicated association, as described elsewhere herein).

As further shown in FIG. 1E, and by reference number 150, the account management system stores the association based on the feedback including the verification. For example, as shown, the association may be indicated within the record log in association with mitigation record 399 (as "Refund of #344") and/or in association with event record 344 (as "Purchase of #399"). In this way, User 1, when reviewing the User 1 Record Log, may determine that mitigation record 399 is associated with event record 344. Accordingly, following the refund transaction with Merchant C, User 1 may verify that the purchase of event record 344 (in whole or in part) has been adjusted and/or offset by the refund of mitigation record 399 (e.g., indicating that funds have been restored to the transaction account). Additionally, or alternatively, the account management system may remove the message prompt from the record log (e.g., so that the user is not prompted to provide redundant or duplicative feedback). For example, the account management system may remove the message prompt by replacing the message prompt with the stored association.

As further shown in FIG. 1E, and by reference number 155, the account management system may retrain the association model based on the feedback. For example, the account management system may retrain and/or update the association model based on charge attributes of the event record, return attributes of the mitigation record, and/or the feedback indicating whether the event record and the mitigation record are associated with one another to improve an accuracy of the association model and/or to dynamically permit the association model to learn one or more indicators of an association or non-association between the event record and the mitigation record.

As described herein, the association model may be a supervised machine learning model and/or may include a supervised machine learning model that is configured to learn to detect associations based on feedback (e.g., from a user and/or a user device). For example, the association model may be trained (e.g., initially), based on the record logs, to make a prediction (e.g., a probability) of whether a mitigation record and an event record are associated. The account management system may provide the prediction to the user device to prompt a user of the user device to provide the feedback (e.g., via a user input) that verifies an accuracy of the prediction (e.g., verifies whether the prediction of an association between a mitigation record and an event record is accurate). Based on received feedback from the user and/or the user device, the account management system may further train (and/or retrain) the association model in order to improve the accuracy of the association model, as described elsewhere herein.

In some implementations, the account management system may use timing associated with an event record and a mitigation record (e.g., a time/date of a purchase transaction and/or a time/date of a refund transaction) to determine an association between the records and/or eliminate certain event records from being considered as associated with a mitigation record. For example, return policies of merchants and/or warranty policies of merchants may define certain time periods during which a refund of a purchase can be obtained. However, lengths of the time periods of the return policies and/or warranty policies may vary from merchant to merchant. Accordingly, as described herein, the account management system may retrain the association model to learn and/or identify time periods associated with return policies and/or warranty policies based on timing between indicated, determined, and/or verified associations between mitigation records and event records. For example, if associations between event records and mitigation records for a particular merchant indicate do not involve a time difference of greater than 90 days, the account management system may learn or determine that a return policy of the merchant involves a 90 day return window.

Additionally, or alternatively, the account management system may use values of an event record and a mitigation record to determine an association between records and/or eliminate certain event records from being considered as associated with a mitigation record. For example, based on the values being the same or different between indicated, determined, and/or verified associations between mitigation records and event records, the account management system may train and/or retrain the association model to learn characteristics associated with differences in values for certain merchants. For example, a foreign merchant involved in a purchase and refund may involve a mitigation record with a different value than an event record based on a change in a exchange rate between a currency used by the account management system and a currency used by the foreign merchant. Accordingly, the account management system may train the association model to identify foreign merchants that permit refunds. In some implementations, some mitigation records may be associated with a refund (e.g., a value added tax refund) provided by a jurisdiction of the foreign merchant. Accordingly, the account management system may train the association model to identify foreign merchants associated with refunds provided by jurisdictions.

In this way, the account management system may accurately and efficiently identify associated records in a record log using a model that is trained from multiple record logs associated with multiple user accounts. For example, the account management system may train and/or use the machine learning model to accurately and efficiently (through filtering techniques) determine an association based on at least a learned or identified duration of a typical or maximum time period between an event record and an associated mitigation record, learned or identified characteristics of differences or similarities in values between an event record and an associated mitigation record, and/or learned or identified determinations of whether an event record associated with the merchant can be associated with a mitigation record involving another identified merchant. Accordingly, the account management system may conserve computing resources and/or network resources that would otherwise be wasted without using an account management system, as described herein.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
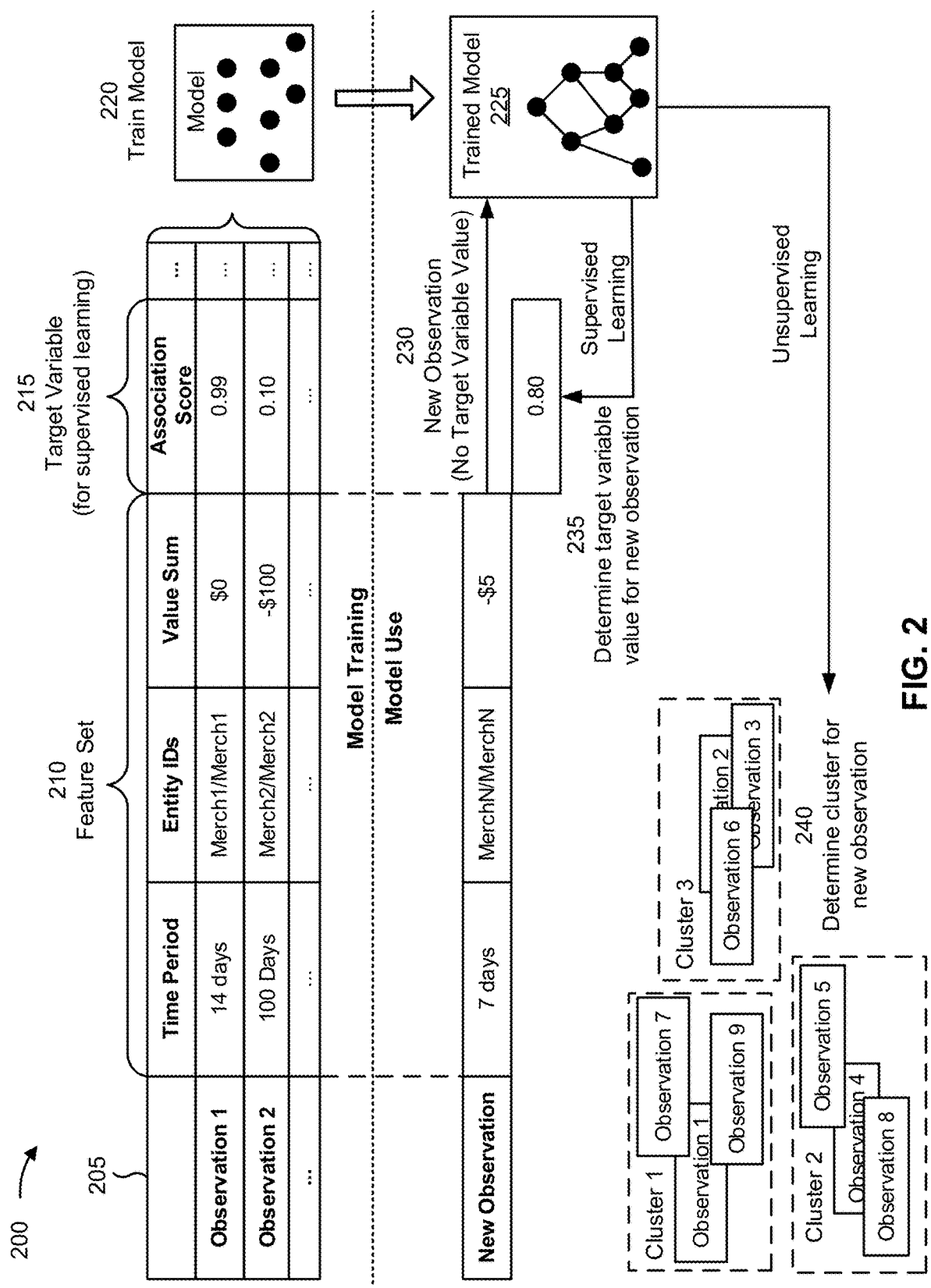
FIG. 2 is a diagram of an example of training and using a machine learning model in connection with a system for detecting associated records in a record log.

FIG. 2 is a diagram illustrating an example 200 of training and using a machine learning model in connection with a system for detecting associated records in a record log. The machine learning model training and usage described herein may be performed using a machine learning system. The machine learning system may include or may be included in a computing device, a server, a cloud computing environment, or the like, such as the account management system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more user devices, one or more transaction terminals, and/or one or more transaction back-end systems, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the account management system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a time period (e.g., a time period between a mitigation record and an event record), a second feature of entity identifiers (entity IDs associated with identified merchants in a mitigation record and an event record), a third feature of a value sum (e.g., a sum of a value in a mitigation record and a value in an event record), and so on. As shown, for a first observation, the first feature may have a value of 14 days (e.g., corresponding to 14 days between the mitigation record and the event record of Observation 1), the second feature may have a value of Merch1/Merch1 (indicating that both the mitigation record and the event record are associated with Merch1), the third feature may have a value of $0 (e.g., indicating that a value of the mitigation record is an additive inverse of the value of the event record), and so on. These features and feature values are provided as examples, and may differ in other examples. For example, the feature set may include one or more of the following features: a type of user account, a location of a transaction, and/or a type of a transaction.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 200, the target variable is an association score, which has a value of 0.99 for the first observation. The association score may indicate a probability that a mitigation record and an event record of the observations are associated to permit the account management system to determine whether there is an association between the mitigation record and the event record, indicate a determined association, and/or prompt a user for feedback based on the association score.

The feature set and target variable described above are provided as examples, and other examples may differ from what is described above. For example, for a target variable of identifying a maximum or typical time period between associated mitigation and event records of a particular merchant (e.g., which can be used for filtering, as described elsewhere herein), the feature set may include types of transactions, a location of the merchant, a location of the transaction, and/or values of the records.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a time period, a second feature of entity identifiers, a third feature of a value sum, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 0.80 for the target variable of an association score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, associating the mitigation record and an event record of the new observation via a mapping in the record log and/or obtaining feedback associated with the mitigation record and the event record (e.g., to verify whether the mitigation record and the event record are associated). The first automated action may include, for example, storing an association between the mitigation record and the event record in the record log, presenting the association via a display, and/or prompting a user to provide feedback associated with the association.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detecting and/or identifying associated records in a record log. The machine learning system enables recognition and/or identification of tens, hundreds, thousands, or millions of features and/or feature values for tens, hundreds, thousands, or millions of observations, thereby increasing accuracy and consistency and reducing delay associated with detecting and/or identifying associated records in a record log relative to requiring computing resources to be allocated for tens, hundreds, or thousands of operators to manually detect and/or identify associated records in a record log using the features or feature values.

As indicated above, FIG. 2 is provided as an example. Other examples may differ from what is described in connection with FIG. 2.

Figure 3:
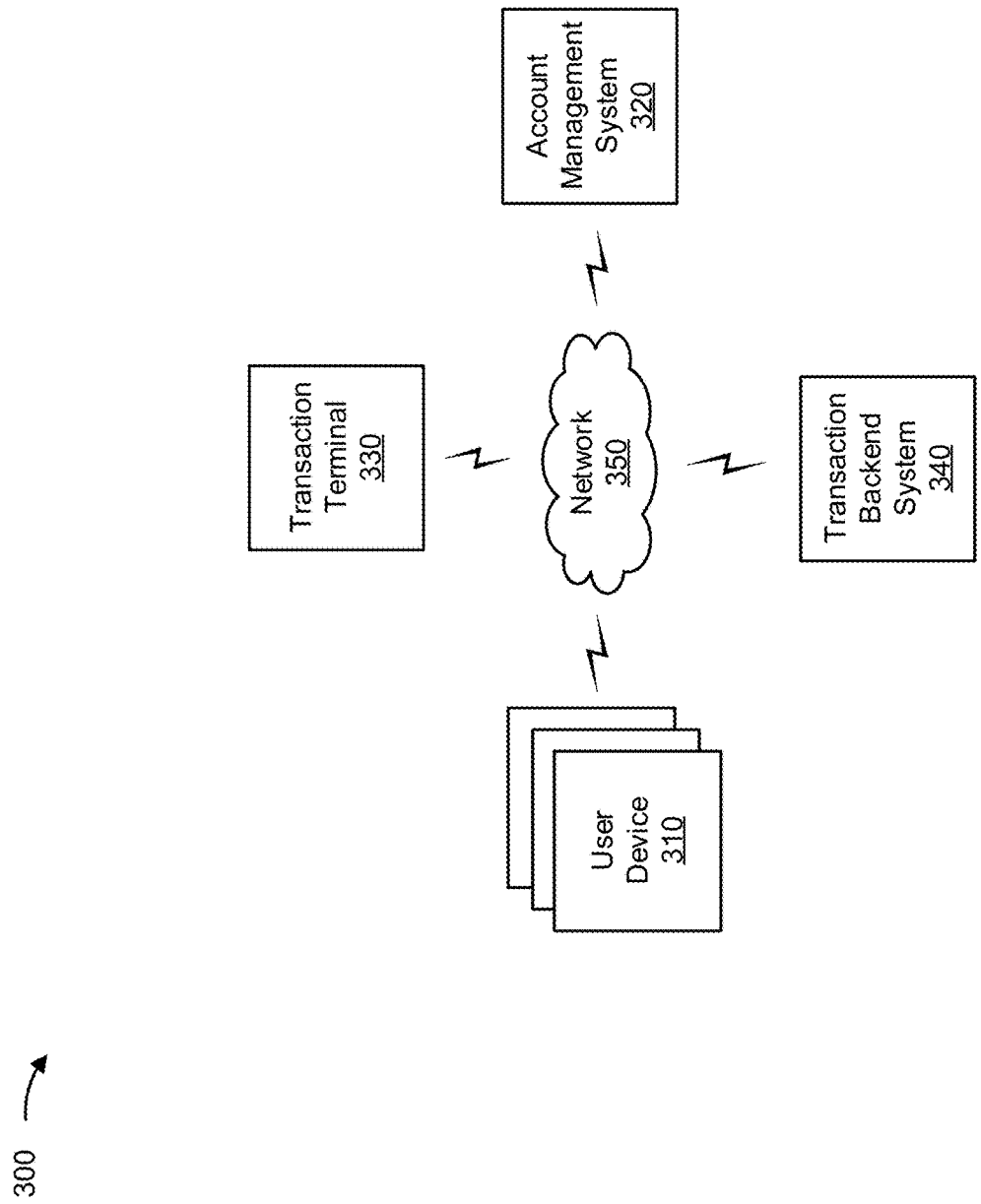
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, an account management system 320, a transaction terminal 330, a transaction backend system 340, and a network 350. Devices of environment 300 may interconnect via wired connections, wireless connections, or a combination of wired and wireless connections.

The user device 310 includes one or more devices capable of receiving, generating, storing, processing, and/or providing information associated with an application that is associated with a system for detecting associated records in a record log, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The account management system 320 includes one or more devices capable of receiving, generating, storing, processing, providing, and/or routing information associated with detecting associated records of a record log, as described elsewhere herein. The account management system 320 may include a communication device and/or a computing device. For example, the account management system 320 may include a server, such as an application server, a client server, a web server, a database server, a host server, a proxy server, a virtual server (e.g., executing on computing hardware), or a server in a cloud computing system. In some implementations, the account management system 320 includes computing hardware used in a cloud computing environment.

The transaction terminal 330 includes one or more devices capable of facilitating an electronic transaction. For example, the transaction terminal 330 may include a point-of-sale (PoS) terminal, a payment terminal (e.g., a credit card terminal, a contactless payment terminal, a mobile credit card reader, or a chip reader), and/or an automated teller machine (ATM). The transaction terminal 330 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the transaction terminal 330 include a number keypad, a touchscreen, a magnetic stripe reader, a chip reader, and/or a radio frequency (RF) signal reader (e.g., a near-field communication (NFC) reader). Example output devices of transaction terminal 330 include a display and/or a speaker.

The transaction backend system 340 includes one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from a transaction terminal, such as transaction data (e.g., information that identifies a transaction amount, a merchant, a time of a transaction, a location of the transaction, or the like), account information communicated to the transaction terminal by a transaction device (e.g., a transaction card, a mobile device executing a payment application, or the like) and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device, an acquiring bank (or merchant bank) associated with the merchant and/or the transaction terminal, and/or a transaction card association (e.g., VISA® or MASTERCARD®) associated with the transaction device. Based on receiving information associated with the transaction device from the transaction terminal, one or more devices of the transaction backend system 340 may communicate to authorize a transaction and/or to transfer funds from an account associated with the transaction device to an account of an entity (e.g., a merchant) associated with the transaction terminal.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
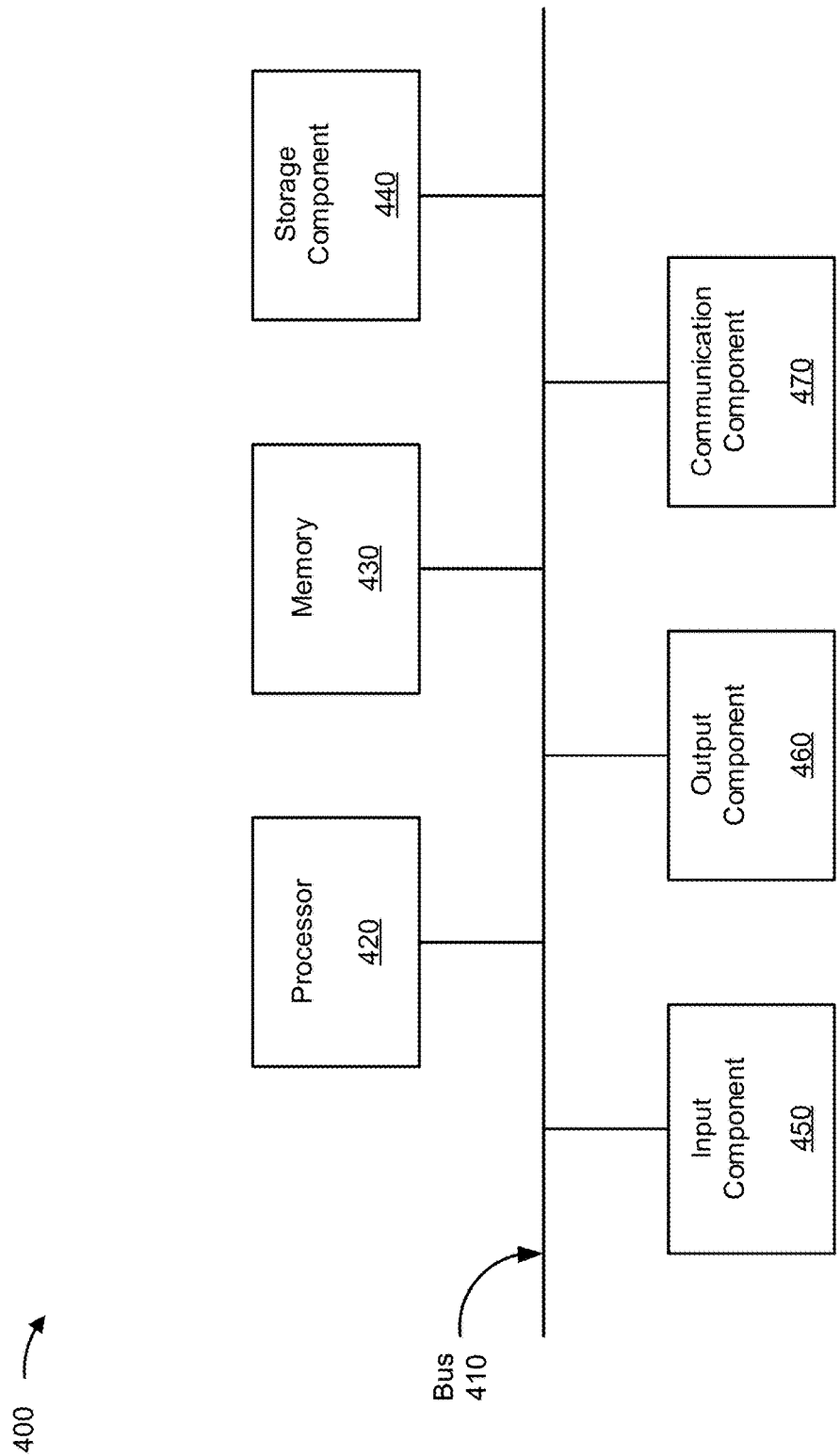
FIG. 4 is a diagram of example components of one or more devices of FIG. 3.

FIG. 4 is a diagram of example components of a device 400, which may correspond to the user device 310, the account management system 320, the transaction terminal 330, and/or the transaction backend system 340. In some implementations, the user device 310, the account management system 320, the transaction terminal 330, and/or the transaction backend system 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with a system for detecting associated records in a record log. In some implementations, one or more process blocks of FIG. 5 may be performed by an account management system (e.g., the account management system 320). In some implementations, one or more process blocks of FIG. 5 may be performed by another device or a group of devices separate from or including the account management system, such as the user device 310, the transaction terminal 330, and/or the transaction backend system 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include monitoring the record log of an account associated with an application (block 510). As further shown in FIG. 5, process 500 may include identifying a mitigation record in the record log (block 520). As further shown in FIG. 5, process 500 may include analyzing, based on identifying the mitigation record, the record log to identify a subset of event records in the record log that are associated with one or more return attributes of the mitigation record (block 530).

As further shown in FIG. 5, process 500 may include determining, using an association model, an association score associated with the mitigation record and an event record of the subset of event records (block 540). The association score may be indicative of a probability that the mitigation record and the event record are associated with a same event. As further shown in FIG. 5, process 500 may include determining that the association score indicates that the probability satisfies a probability threshold (block 550).

As further shown in FIG. 5, process 500 may include appending, to the mitigation record, a message prompt that causes the application to indicate an association between the mitigation record and the event record when the event record is presented via a display of a user device that is executing the application (block 560). As further shown in FIG. 5, process 500 may include receiving, from the user device, feedback associated with the message prompt that verifies whether the mitigation record is associated with the event record (block 570). As further shown in FIG. 5, process 500 may include performing an action associated with the feedback, the mitigation record, and the event record (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting associated records in a record log, the system comprising:
    one or more memories; and
    one or more processors, communicatively coupled to the one or more memories, configured to:
        monitor the record log of an account associated with an application;
        identify a mitigation record in the record log;
        analyze, based on identifying the mitigation record, the record log to identify a subset of event records in the record log that are associated with one or more return attributes of the mitigation record;
        train, based on using a set of observations and one or more machine learning algorithms, an association model,
            wherein the one or more machine learning algorithms include at least one of a regression algorithm, a decision tree algorithm, a neural network algorithm, a k-nearest neighbor algorithm, and a support vector machine algorithm;
        generate, based on applying the trained association model to a new observation that includes at least one of a time period, a second feature of entity identifiers, or a third feature of a value sum, an output that includes at least one of:
            a predicted value of a target variable when supervised learning is utilized,
            information that identifies a cluster to which the new observation belongs when unsupervised learning is utilized, or
            information that indicates a degree of similarity between the new observation and other observations;
        determine, based on the output, an association score associated with the mitigation record and a particular event record of the subset of event records,
            wherein the association score is indicative of a probability that the mitigation record and the particular event record are associated with a same event;
        determine that the association score indicates that the probability satisfies a probability threshold;
        append and store, to the mitigation record and based on determining that the association score indicates that the probability satisfies the probability threshold, a message prompt configured to be displayed during a session with a user device, that causes the application to indicate an association between the mitigation record and the particular event record when the particular event record is presented via a display of the user device that is executing the application,
            wherein information associated with the message prompt indicates that the message prompt is to be displayed during the session;
        monitor the record log being accessed by the user device;
        determine, based on the monitoring, that the particular event record is being accessed by the user device and is associated with the message prompt;
        cause display of the appended and stored message prompt based on determining that the particular event record is being accessed by the user device;
        receive, from the user device, feedback associated with the message prompt that verifies whether the mitigation record is associated with the event record;
        retrain, based on the received feedback, the association model;
        perform an action associated with the feedback, the mitigation record, and the event record;
        use the retrained association model for subsequent processing to determine another association score associated with another mitigation record; and
        remove, based on performing the action, the message prompt by replacing the message prompt with information indicating the association between the mitigation record and the particular event record.

2. The system of claim 1, wherein the one or more processors, when analyzing the record log, are configured to at least one of:
    filter, from records of the record log, other mitigation records from the record log;
    filter, from records of the record log, certain event records that are outside of a time period associated with a time of the mitigation record that is identified by a timestamp attribute of the one or more return attributes;
    filter, from records of the record log, certain event records that are associated with a value that is outside of a range from zero to an additive inverse of a value attribute of the mitigation record that is identified by the one or more return attributes; or
    filter, from records of the record log, certain event records that are not associated with an entity that is identified by an entity attribute of the one or more return attributes.

3. The system of claim 1, wherein the probability threshold is based on the association score.

4. The system of claim 1, wherein the association model comprises a machine learning model that is trained to identify associations between newly identified mitigation records and previously stored event records of a plurality of accounts of the application,
- wherein the machine learning model is trained based on historical records associated with the plurality of accounts and previously determined associations between historical mitigation records of the historical records and historical event records of the historical records.

5. The system of claim 1, wherein the one or more processors, when performing the action, are configured to:
- determine that the feedback includes a verification that the mitigation record is associated with the particular event record; and
- replace the message prompt with an indication that the mitigation record is associated with the particular event record.

6. The system of claim 5, wherein the one or more processors are further configured to:
- append, to the event record, another indication that the mitigation record is associated with the particular event record.

7. The system of claim 1, wherein the one or more processors, when performing the action, are configured to:
- determine that the feedback includes an indication that the mitigation record is not associated with the particular event record;
- remove the message prompt from the mitigation record; and
- update the association model based on the feedback, the mitigation record, and the particular event record.

8. A method for detecting associated records in a record log, comprising:
- identifying, by a device, a mitigation record in the record log associated with an account of an application;
- training, based on using a set of observations that do not include a target variable and one or more machine learning algorithms, an association model;
- generating, based on applying the trained association model to a new observation that includes at least one of a time period, a second feature of entity identifiers, or a third feature of a value sum, an output;
- determining, by the device and based on the output, an association score associated with the mitigation record and a particular event record of the record log,
  - wherein the association score is indicative of a probability that the mitigation record and the particular event record are associated with a same event, and
  - wherein the association score is determined based on a comparison of return attributes of the mitigation record and charge attributes of the particular event record;
- determining, by the device, that the association score indicates that the probability satisfies a probability threshold;
- appending and storing, by the device and based on determining that the associated score indicates that the probability satisfies the probability threshold, a message prompt to the mitigation record,
  - wherein the message prompt is configured to be displayed during a session with a user device, and
  - wherein the message prompt causes the application to request, during the session, an indication of whether there is an association between the mitigation record and the particular event record;
- monitoring, by the device, the record log being accessed by the user device;
- determining, by the device and based on the monitoring, that the particular event record is being accessed by the user device and is associated with the message prompt;
- causing, by the device, display of the message prompt based on determining that the particular event record is being accessed by the user device;
- receiving, by the device and from the user device, feedback associated with the message prompt that indicates whether the mitigation record is associated with the particular event record;
- retraining, by the device and based on the received feedback, the association model;
- performing, by the device and based on the feedback, an action associated with indicating whether the mitigation record and the particular event record are associated;
- using the retrained association model for subsequent processing for determining another association score associated with another mitigation record; and
- removing, by the device and based on performing the action, the message prompt by replacing the message prompt with information indicating the association between the mitigation record and the particular event record.

9. The method of claim 8, wherein the return attributes include at least two of a timestamp associated with the mitigation record, a value of the mitigation record, or an entity identifier associated with the mitigation record, and
- wherein the charge attributes correspondingly include at least two of a timestamp associated with the particular event record, a value of the particular event record, or an entity identifier associated with the particular event record.

10. The method of claim 8, wherein the association model comprises a machine learning model that is trained to identify associations between newly identified mitigation records and previously stored event records of a plurality of accounts of the application.

11. The method of claim 8, wherein the message prompt is configured to cause the application to prompt, when the mitigation record is presented via a display of the user device, to provide the feedback via a user interface of the application.

12. The method of claim 8, wherein performing the action comprises:
- determining that the feedback includes a verification that the mitigation record is associated with the particular event record; and
- storing, within the record log, a mapping between the mitigation record and the particular event record.

13. The method of claim 8, wherein performing the action comprises:
- determining that the feedback includes an indication that the mitigation record is not associated with the particular event record;
- removing the message prompt from the mitigation record; and
- retraining the association model based on the feedback, the mitigation record, and the particular event record.

14. The method of claim 8, further comprising:
- retraining the association model based on the feedback, the mitigation record, and particular the event record.

15. A non-transitory computer-readable medium storing a set of instructions, the set of instructions comprising:

one or more instructions that, when executed by one or more processors of a system, cause the system to:
  detect that a mitigation record has been added to a record log associated with an account of an application;
  train, based on using a set of observations that do not include a target variable and one or more machine learning algorithms, an association model;
  generate, based on applying the trained association model to a new observation that includes at least one of a time period, a second feature of entity identifiers, or a third feature of a value sum, an output;
  determine, based on the output, based on detecting the mitigation record, a probability that the mitigation record is associated with a particular event record of the record log based on a return attribute of the mitigation record,
    wherein the association model comprises a machine learning model that is trained to identify associations between newly identified mitigation records and previously stored event records of a plurality of accounts of the application;
  append and store, to the mitigation record and based on determining the probability satisfying a probability threshold, an association tag that indicates an association between the mitigation record and the particular event record,
    wherein the association tag includes information that indicates a message prompt that is configured to be displayed during a session with a user device;
  monitor the record log being accessed by the user device;
  determine, based on the monitoring, that the particular event record is being accessed by the user device and is associated with the stored message prompt;
  cause display of the stored message prompt based on determining that the particular event record is being accessed by the user device;
  receive feedback associated with the message prompt;
  retrain, based on the received feedback, the association model;
  cause, based on the association tag, the application to indicate the association between the mitigation record and the particular event record on a display of the user device associated with the account;
  use the retrained association model for subsequent processing for determining another association score associated with another mitigation record; and
  remove the message prompt by replacing the message prompt with information indicating the association between the mitigation record and the particular event record.

16. The non-transitory computer-readable medium of claim 15, wherein the return attribute comprise at least one of:
  a timestamp associated with the mitigation record;
  a value of the mitigation record; or
  an entity identifier associated with the mitigation record.

17. The non-transitory computer-readable medium of claim 15, wherein the machine learning model is trained based on historical records associated with the plurality of accounts and previously determined associations between historical mitigation records of the historical records and historical event records of the historical records.

18. The non-transitory computer-readable medium of claim 15, wherein the machine learning model comprises at least one of a clustering model or a neural network.

19. The non-transitory computer-readable medium of claim 15, wherein the one or more instructions, further cause the system to:
  cause the application to prompt the user device to verify that the mitigation record and the particular event record are associated;
  receive, from the user device, feedback that indicates whether the mitigation record is associated with the particular event record; and
  retrain the association model based on the feedback.

20. The non-transitory computer-readable medium of claim 15, wherein the account is a transaction account, the mitigation record corresponds to a refund transaction associated with a merchant, and the particular event record corresponds to a purchase transaction involving the merchant.

* * * * *